Patented May 28, 1929.

1,715,088

UNITED STATES PATENT OFFICE.

HARRY E. KAISER AND ROY S. HANCOCK, OF KENVIL, NEW JERSEY, ASSIGNORS TO HERCULES POWDER COMPANY, OF WILMINGTON, DELAWARE, A CORPORATION OF DELAWARE.

METHOD OF REFINING ROSIN.

No Drawing. Application filed June 8, 1928. Serial No. 283,830.

Our invention relates to an improved method for refining rosin and more especially for removing color bodies from low grade rosin.

The method in accordance with our invention may be applied to the refining of either wood rosin or gum rosin, which as is known comprise abietic acid and impurities, as color bodies, etc., but is more particularly advantageous in the refining of such rosins where they contain color bodies which, while they do not primarily influence the color of freshly refined rosin, tend to darken on aging, especially in the presence of oxygen, as in the air, and an alkali, and which may be designated as latent color bodies.

Such latent color bodies are found to a small extent in certain low grades of gum rosin and generally in wood rosin and have the effect of rendering rosins in which they are contained of relatively low value for many purposes, as where the rosin is combined with an alkali and subsequently exposed to the air, as, for example, in soaps, limed varnishes, sizes for paper, etc., since on the darkening of the latent color bodies the appearance of the product is injured and hence it is ab initio of low grade and may not be used where a soap, limed varnish, size, or the like, which will not discolor, is required.

Now, in accordance with our invention, we have discovered that wood and gum rosin generally, as well as rosin containing latent color bodies, may be refined and brought up to high grade by treatment of the rosin with two liquids which are substantially immiscible at some definite temperature and one of which will be a solvent of the rosin (abietic acid), but not of the color bodies, while the other will be a solvent of the color bodies and more especially of the latent color bodies.

The two liquids involved in the treatment in accordance with our invention are preferably organic liquids and the liquid, solvent of the color bodies, may also be a solvent for the rosin and is preferably non-alkaline. The two liquids desirably are substantially immiscible at or below a normal temperature, say, for example, a temperature within the range 5° F.–125° F. and may be and desirably are capable of miscibility at elevated temperatures.

In carrying out the treatment in accordance with our invention, the rosin to be refined is dissolved in the liquid solvent therefor and the liquid, solvent of the color bodies, is added to the solution and brought into intimate contact therewith by agitation of the mixture, at a temperature at which the liquids are substantially immiscible, or by the formation of a homogeneous solution through elevation of the temperature of the mixture. Intimate contact of the liquid solvent of the color bodies, with the rosin solution permits the liquid, solvent of the color bodies, to selectively dissolve the color bodies, the rosin remaining in solution in the liquid solvent thereof. After effecting intimate contact between the liquids, they are permitted to separate, after reduction of temperature, if they were put into solution, or in any event if rapidity and completeness of separation is desired. As a result of the separation of the two liquids, one will contain essentially the rosin in solution and the other will contain essentially the color bodies in solution. The rosin, refined and freed from the color bodies dissolved in the liquid solvent thereof, may be readily recovered by evaporating off the solvent from the separated rosin solution.

Alternatively, where the liquid, solvent of the color bodies, is also a solvent of the rosin, the rosin containing the color bodies may be dissolved in the liquid, solvent of the color bodies, and the liquid, solvent of the rosin, added. The two liquids are intimately contacted and then separated, by agitation at a temperature at which they are substantially immiscible, or by forming a homogeneous solution through elevation of the temperature of the mixture, the refined rosin being recovered from solution in the liquid solvent of the rosin.

In carrying out the method in accordance with our invention, while the liquid, solvent of the rosin, will not be a solvent of the color bodies, and since the liquid, solvent of the color bodies, may also be a solvent of the rosin, it will be ordinarily necessary to use a larger quantity of the liquid, solvent of the rosin, than of the liquid, solvent of the color bodies. Further, on separation of the two liquids, after intimate contact, it will be found that the rosin solution will contain some of the liquid, solvent of the color bodies, and some color bodies dissolved therein, while the color body solution will contain some rosin and liquid, solvent of the rosin. However, the color bodies present in the rosin solution will ordinarily be inconsequential, but where consequential they may be removed by re-treatment of the rosin solution with a further quantity of liquid, solvent of the color bodies. Generally speaking, the degree of completeness of separation of the two liquids and of the color bodies from the rosin will depend upon the relative proportions of the liquids and of the temperature of separation, it being obvious that a more complete separation of the two liquids may be effected at one temperature than at another below the maximum temperature at which they are substantially immiscible. Thus, it will be noted that whether or not the temperature of the admixed liquids be elevated above that at which the liquids are substantially immiscible, in order to produce a homogeneous solution, the separation of the liquids may be effected under temperature conditions reduced below that at which they are substantially immiscible.

In carrying out the method in accordance with our invention, there may be used as the liquid, solvent of the rosin, for example, petroleum ether, naptha, gasoline, kerosene, and the like, or operable equivalents therefor; while as the liquid, solvent of the color bodies, there may be used, for example, furfural, furfuryl alcohol, aniline, liquid sulphur dioxide, phenol chlorohydrins, as ethylene chlorohydrin, and the like, or operable equivalents therefor.

As illustrative of the practical application of the method in accordance with our invention, for example, 15 pounds of wood rosin, are dissolved in 85 pounds of gasoline and to the solution formed is added 11 pounds of technical furfural and the mixture thoroughly agitated to secure intimate contact between the furfural and the gasoline-rosin solution. The mixture is then allowed to separate with the result that the furfural and dissolved color bodies will separate into a layer beneath a layer of gasoline-rosin solution, which may be siphoned or decanted off and from which refined rosin substantially freed from color bodies may be recovered by distillation off of the gasoline. The treatment above may be carried out at normal room temperature, say about 60° F., or alternatively the mixture of rosin solution and furfural may be heated to a temperature at which the furfural will go into solution in the gasoline, for example, a temperature of about 115° F., after which the temperature of the resultant solution is lowered to a point at which the furfural and gasoline solution are immiscible or will separate, which may be a normal room temperature, say 60° F., or lower, say 10° F. and the separation may be effected at a temperature lower than normal room temperature, say 10° F., whether the mixture of gasoline-rosin solution and furfural is heated or merely agitated, it being appreciated that the lower the temperature used, the more rapid and complete will be the separation.

On separation of the gasoline-rosin solution from the furfural-color body solution, it will be found that the gasoline-rosin solution will contain also some furfural and a small amount of color bodies and that the furfural-color bodies solution will also contain some gasoline and rosin, since the furfural is not completely immiscible with or separable from the gasoline and the furfural has a solvent power on the rosin though used in insufficient quantity, relative to the quantity of gasoline used, to take up any very substantial quantity of the rosin. If a more completely refined rosin is desired, the gasoline-rosin solution, after treatment with and separation from the furfural, may be retreated with a further quantity of furfural, or a greater quantity of furfural, relative to the quantity of gasoline, may be used in the initial treatment, though such proceeding will reduce the yield of refined rosin.

As illustrative of an alternative application of the method embodying our invention, for example, 15 pounds of rosin may be dissolved in 11 pounds of technical furfural and 85 pounds of gasoline added to the solution. The mixture is then agitated, or heated to a temperature at which the furfural will dissolve in the gasoline, say 115° F., followed by separation of the gasoline-rosin solution from the furfural-color-bodies solution, at room temperature, say 60° F. or below, say 10° F. If desired, the rosin solution, after separation from the furfural-color-bodies solution, may be treated with furfural for further refinement of the rosin.

In the refining of rosin in accordance with our invention, as has been indicated, we may use as the liquid, solvent for the color bodies, for example, furfuryl alcohol, aniline, liquid sulphur dioxide, phenol, chlorohydrin, as ethylene chlorohydrin, etc., in place of furfural and it will be understood that the method of treatment of the rosin with such substances is substantially the same as above described in connection with furfural, differing only in the relative amounts of the substances used relative to the amount of the liquid, solvent of the rosin, and in the desirable temperatures to effect a homogeneous solution, when such is effected as compared with agitation, and in connection with separation of the liquids.

By way of illustration, furfuryl alcohol is used in the proportion of about 11 pounds to about 85 pounds of gasoline containing 15 pounds of rosin, and if a homogeneous solution is to be formed the mixture may be heated to about 115° F., separation being desirably effected after cooling to about 60°

F.; aniline may be used in the proportion of about 250 pounds of aniline to about 800 pounds of gasoline containing 120 pounds of rosin, and if a homogeneous solution is to be formed the mixture may be heated to about 100° F., separation being desirably effected after cooling to about 15° F.; ordinary phenol may be used in the proportion of about 290 pounds of ordinary phenol, containing 20 pounds of water, to about 800 pounds of gasoline containing 120 pounds of rosin, and if a homogeneous solution is to be formed the mixture may be heated to about 160° F., separation being desirably effected after cooling to about 40° F.; and ethylene chlorohydrin may be used in the proportion of about 125 pounds ethylene chlorohydrin to about 500 pounds of gasoline containing 75 pounds of rosin, and if a homogeneous solution is to be formed the mixture may be heated to about 150° F., separation being desirably effected after cooling to about 40° F. When liquid sulphur dioxide is used suitable measures are taken to prevent its vaporization during the treatment, as by carrying out the treatment under pressure. The liquid sulphur dioxide is desirably used in the amount of about 250 pounds to about 400 pounds of gasoline containing 60 pounds of rosin in solution and the desirable intimate contact is obtained by agitation.

In carrying out the method in accordance with our invention, as will be obvious, the liquid, solvent of the rosin, may be recovered for reuse by condensation in connection with recovery of the refined rosin by distillation off of the solvent and likewise the liquid, solvent of the color bodies, may be recovered for reuse by distillation off from the color bodies and any rosin dissolved therein. Any rosin recovered by distillation off of the liquid, solvent of the color bodies, will be very dark in color, but may be refined by treatment in accordance with our invention.

In the applications of the method in accordance with our invention, as set forth above, either wood or gum rosin may be subjected to treatment and the treatment will be most advantageously applied to the refining of wood rosin which generally contains latent color bodies or to gum rosin of low grade and containing latent color bodies. Where the treatment is applied to wood rosin, such may be treated as present in drop liquor when the percentage of rosin is preferably not over about fifteen per cent.

The rosin resultant from the treatment of wood or gum rosin in accordance with our invention will be found to be a light colored, highly refined product capable of use in connection with the manufacture of the highest grades of soap, varnish, size, etc. and in the case of the treatment of wood rosin and of gum rosin containing latent color bodies, which tend to darken in the presence of air and an alkali, the product will be found to be substantially free from such latent color bodies and comparable with the naturally high grade gum rosin. The refined rosin, and especially wood rosin, resultant from treatment of low grade rosin in accordance with our invention will differ from naturally high grade gum rosin in various characteristics, particularly in that it will have a substantially lower degree of optical rotation than that of high grade gum rosin, will have a lower content of gasoline insolubles and will generally have a lower ester value.

The treatment in accordance with our invention furthermore will effect an increase in the acid number of the rosin treated.

It will be understood that our invention contemplates the use not only of the liquids, solvent of the rosin, and liquids, solvent of the color bodies, mentioned, but also any other liquids which are operable equivalents for the liquids mentioned.

It will be obvious that the method in accordance with our invention may be carried out without the use of any particular form of apparatus.

This application is a continuation in part and includes all the subject matter of an application filed by us June 5, 1925, Serial No. 35,245 (Kaiser & Hancock Case 1); an application filed by us March 6, 1926, Serial No. 92,890 (Kaiser & Hancock Case 2); an application filed by us April 27, 1926, Serial No. 105,022 (Kaiser & Hancock Case 3); and an application filed by us December 27, 1926, Serial No. 157,408 (Kaiser & Hancock Case 7), and includes broadly the subject matter of an application filed by us August 18, 1926, Serial No. 130,103 (Kaiser & Hancock Case 4).

Having now fully described our invention, what we claim and desire to protect by Letters Patent is:—

1. In the method of refining rosin the step which includes subjecting rosin to treatment with furfural for removal of color bodies therefrom.

2. In the method of refining rosin the step which includes subjecting rosin in solution to treatment with furfural for removal of color bodies therefrom.

3. The method of refining rosin, which includes dissolving rosin in a solvent substantially immiscible with furfural at normal temperatures, treating the rosin solution with furfural for the extraction of color bodies from the rosin, separating furfural and color bodies from the rosin solution and recovering refined rosin from the rosin solution.

4. The method of refining wood rosin, which includes dissolving wood rosin in a solvent substantially immiscible with furfural at normal temperatures, treating the rosin solution with furfural for the extraction of color bodies from the rosin, separating furfural and color bodies from the rosin solution and recovering refined wood rosin from the rosin solution.

5. The method of refining wood rosin, which includes dissolving wood rosin in a solvent substantially immiscible with furfural at normal temperatures, treating the rosin solution with furfural for the extraction of color bodies from the rosin, reducing the temperature of the rosin solution, separating furfural and extracted color bodies from the rosin solution and recovering refined wood rosin from the rosin solution.

6. The method of refining wood rosin, which includes dissolving wood rosin in gasoline, treating the gasoline-rosin solution with furfural for the extraction of color bodies from the rosin, separating furfural and extracted color bodies from the gasoline-rosin solution and recovering refined wood rosin from the gasoline-rosin solution.

7. The method of refining rosin, which includes dissolving rosin in gasoline, treating the gasoline-rosin solution with furfural for the extraction of color bodies from the rosin, separating furfural and extracted color bodies from the gasoline-rosin solution and recovering refined rosin from the gasoline-rosin solution.

8. The method of refining wood rosin, which includes dissolving wood rosin in gasoline, treating the gasoline-rosin solution with furfural for the extraction of color bodies from the rosin, reducing the temperature of the rosin solution, separating furfural and extracted color bodies from the gasoline-rosin solution and recovering refined wood rosin from the gasoline-rosin solution.

9. The method of refining wood rosin, which includes dissolving wood rosin in a solvent substantially immiscible with furfural at normal temperatures, adding furfural to the rosin solution for the extraction of color bodies from the rosin, heating the rosin solution to a temperature at which furfural will go into a solution in the rosin solution, cooling the solution formed to a temperature at which furfural and extracted color bodies will be thrown out of solution from the rosin solution, separating furfural and extracted color bodies from the rosin solution and recovering refined rosin from the wood rosin solution.

10. The method of refining wood rosin, which includes dissolving wood rosin in gasoline, adding furfural to the gasoline-rosin solution for the extraction of color bodies from the rosin, heating the gasoline-rosin solution to a temperature at which furfural will go into solution in the gasoline-rosin solution, cooling the solution formed to a temperature at which furfural and extracted color bodies will be thrown out of solution from the gasoline-rosin solution, separating furfural and extracted color bodies from the gasoline-rosin solution and recovering refined wood rosin from the gasoline-rosin solution.

11. The method of refining wood rosin, which includes dissolving wood rosin in gasoline, adding furfural to the gasoline-rosin solution for the extraction of color bodies from the rosin, heating the gasoline-rosin solution to a temperature at which furfural will go into solution in the gasoline-rosin solution, reducing the temperature of the solution formed below 25°F., separating the furfural and extracted color bodies from the gasoline-rosin solution and recovering refined wood rosin from the gasoline-rosin solution.

12. The method of refining rosin containing latent color bodies which includes subjecting the rosin in solution in an organic solvent to treatment with an organic solvent having a preferential affinity for the latent color bodies contained in the rosin and which is capable of substantial immiscibility with the solvent for the rosin and recovering refined rosin from the solvent for the rosin.

13. The method of refining rosin containing latent color bodies which includes subjecting the rosin to treatment with two organic liquids, one primarily a solvent of the rosin and one primarily a solvent of latent color bodies contained in the rosin, the two liquids being substantially immiscible at a normal temperature, separating the two solutions and recovering refined rosin from the liquid primarily a solvent of the rosin.

14. The method of treating rosin containing latent color bodies which includes admixing a solution of the rosin in an organic solvent for the rosin, with an organic solvent having a preferential affinity for latent color bodies contained in the rosin and which is substantially immiscible with the rosin solvent at a normal temperature, heating the mixture to form a homogeneous solution, cooling the homogeneous solution to obtain separation of a solution of rosin in the rosin solvent and a solution of color bodies in the solvent having preferential affinity for color bodies and recovering refined rosin from the separated solution of rosin in the rosin solvent.

15. The method of refining rosin containing latent color bodies which includes subjecting the rosin to treatment with two liquids, one primarily a solvent of the rosin and one primarily a solvent of latent color bodies contained in the rosin, the two liquids being substantially immiscible at a normal temperature and the liquid solvent of the latent color bodies being present in amount substantially less than the amount of the liquid solvent of the rosin, separating the two solutions and recovering refined rosin from the liquid primarily solvent of the rosin.

16. The method of refining rosin containing latent color bodies which includes admixing the rosin in solution in an organic solvent with an organic solvent having a preferential affinity for the latent color bodies contained in the rosin and which is capable of substantial immiscibility with the solvent for the rosin, reducing the temperature of the mixture, separating a solution of rosin in the solvent therefor from a solution of latent color bodies in the solvent having preferential affinity therefor and recovering refined rosin from the solution of rosin in the rosin solvent.

In testimony of which invention, we have hereunto set our hands, at Kenvil, New Jersey, on this 5th day of June, 1928.

HARRY E. KAISER.
ROY S. HANCOCK.